US012802843B2

(12) United States Patent
Shi et al.

(10) Patent No.: US 12,802,843 B2
(45) Date of Patent: Nov. 17, 2026

(54) NEODYMIUM-IRON-BORON MAGNET, PREPARATION METHOD AND USE THEREOF

(71) Applicant: YANTAI ZHENGHAI MAGNETIC MATERIAL CO., LTD., Yantai (CN)

(72) Inventors: Bingqiang Shi, Yantai (CN); Lei Liu, Yantai (CN); Dan Ma, Yantai (CN); Yunting Su, Yantai (CN)

(73) Assignee: YANTAI ZHENGHAI MAGNETIC MATERIAL CO., LTD., Yantai (CN)

( * ) Notice: Subject to any disclaimer, the term of this patent is extended or adjusted under 35 U.S.C. 154(b) by 716 days.

(21) Appl. No.: 17/999,989

(22) PCT Filed: May 24, 2021

(86) PCT No.: PCT/CN2021/095528

§ 371 (c)(1),
(2) Date: Nov. 28, 2022

(87) PCT Pub. No.: WO2021/238867

PCT Pub. Date: Dec. 2, 2021

(65) Prior Publication Data

US 2023/0207165 A1 Jun. 29, 2023

(30) Foreign Application Priority Data

May 27, 2020 (CN) ......................... 202010464304.9

(51) Int. Cl.
*H01F 1/057* (2006.01)
*B22F 3/24* (2006.01)
(Continued)

(52) U.S. Cl.
CPC ............. *H01F 1/057* (2013.01); *H01F 7/021* (2013.01); *H01F 41/0293* (2013.01); *H01F 38/00* (2013.01)

(58) Field of Classification Search
None
See application file for complete search history.

(56) References Cited

U.S. PATENT DOCUMENTS

| | | | | |
|---|---|---|---|---|
| 2004/0000359 | A1 | 1/2004 | Tayu et al. | |
| 2014/0062631 | A1 * | 3/2014 | Sagawa .................. | H01F 1/057 335/302 |

(Continued)

FOREIGN PATENT DOCUMENTS

| | | | |
|---|---|---|---|
| CN | 101939804 | A | 1/2011 |
| CN | 105374486 | A | 3/2016 |

(Continued)

OTHER PUBLICATIONS

Kim Tae-Hoon et al.; "Anisotropic diffusion mechanism in grain boundary diffusion processed Nd—Fe—B sintered magnet"; Acta Materialia; vol. 112; Year: 2016; pp. 59-66.

*Primary Examiner* — Xiaowei Su
(74) *Attorney, Agent, or Firm* — NKL Law; Allen Xue

(57) ABSTRACT

A neodymium-iron-boron (NdFeB) magnet is represented by a chemical formula R1-R2-Fe-M-B, and has a composite structure of a high-coercivity region and a high-remanence region. In the formula R1 is a rare earth element comprising at least Nd, R2 is a heavy rare earth element comprising at least Dy and/or Tb, and M is a transition metal element comprising at least Co. The neodymium-iron-boron magnet can greatly improve resistance to high-temperature demagnetization and inhibit reduction of magnetic flux of a magnet by adopting a small amount of Dy/Tb. The magnet can be used in an embedded high-speed motor. The preparing method for the magnet improves the material utilization and the production efficiency, and is feasible for a large-scale production.

19 Claims, 3 Drawing Sheets

(51) Int. Cl.

| | |
|---|---|
| ***B22F 9/04*** | (2006.01) |
| ***H01F 7/02*** | (2006.01) |
| ***H01F 41/02*** | (2006.01) |
| *H01F 38/00* | (2006.01) |

(56) References Cited

U.S. PATENT DOCUMENTS

| | | | | |
|---|---|---|---|---|
| 2017/0178778 | A1* | 6/2017 | Mao | H01F 1/442 |
| 2019/0304638 | A1 | 10/2019 | Nagamine et al. | |
| 2019/0371522 | A1* | 12/2019 | Kuniyoshi | H01F 1/0536 |
| 2020/0005996 | A1* | 1/2020 | Yang | H01F 41/0293 |
| 2021/0305852 | A1* | 9/2021 | Hayakawa | H01F 7/021 |
| 2022/0328245 | A1* | 10/2022 | Shi | C21D 6/008 |

FOREIGN PATENT DOCUMENTS

| | | | |
|---|---|---|---|
| CN | 105489369 | A | 4/2016 |
| CN | 106205992 | A | 12/2016 |
| CN | 111653404 | A | 9/2020 |
| EP | 3594975 | A1 | 1/2020 |
| JP | 2006303433 | A | 11/2006 |
| JP | 2009088206 | A | 4/2009 |
| JP | 2010119190 | A | 5/2010 |
| JP | 2010135529 | A | 6/2010 |
| JP | 2018056188 | A | 4/2018 |
| JP | 2018082145 | A | 5/2018 |
| JP | 2018093202 | A | 6/2018 |
| JP | 2018107928 | A | 7/2018 |

* cited by examiner

NEODYMIUM-IRON-BORON MAGNET, PREPARATION METHOD AND USE THEREOF

CROSS-REFERENCE TO RELATED APPLICATIONS

This application is a U.S. national stage entry of PCT International Application No. PCT/CN2021/095528, filed on May 24, 2021, which claims priority to Chinese Patent Application No. 202010464304.9 entitled "NEODYMIUM-IRON-BORON MAGNET, PREPARATION METHOD AND USE THEREOF" filed before China National Intellectual Property Administration on May 27, 2020, the content of which is incorporated herein by reference in its entirety.

TECHNICAL FIELD

The present disclosure belongs to the field of neodymium-iron-boron magnet, and in particular, relates to a neodymium-iron-boron magnet, preparation method and use thereof.

BACKGROUND

Sintered neodymium-iron-boron magnet, as the fourth generation permanent magnetic material, is known as the "king of permanent magnets" with its excellent magnetic performance, and is widely applied to various fields such as automobile, wind power, compressor, elevator, industrial automation and the like.

When a high-speed motor is in operation, the sintered neodymium-iron-boron magnet in the motor is exposed to a high-temperature environment due to heat generated by the winding and the iron core, and thermal demagnetization easily occurs due to the action of a reverse magnetic field from the winding. Therefore, the neodymium-iron-boron magnet for the high-speed motor needs to have certain coercivity to provide enough resistance to thermal demagnetization so as to ensure that the magnet can stably output a magnetic field even at high temperature and ensure the power output of the motor.

In conventional technology, in order to improve the coercivity of a magnet, heavy rare earth elements such as Dy (dysprosium) and/or Tb (terbium) are often added to a neodymium-iron-boron magnet to improve the anisotropy of the magnet, so as to achieve the purpose of improving the coercivity of the magnet. However, Dy and/or Tb are added to replace Nd (neodymium) to form Dy—Fe—B or Tb—Fe—B, and the magnetic polarization strength of the Dy—Fe—B and Tb—Fe—B is significantly lower than that of Nd—Fe—B, so that the remanence of the magnet is reduced, namely, the magnetic field strength which can be provided by the magnet is reduced finally, resulting in the reduction of the motor power or the need to increase the amount of magnetic steel used in the motor to ensure the power output of the motor; meanwhile, the heavy rare earth is very expensive due to reserves and excellent characteristics, and the cost of the magnet is greatly improved with the increase of the amount of the used heavy rare earth.

In recent years, it has become one of the research hotspots for numerous scholars to reduce the amount of heavy rare earth used and to improve the coercivity of a magnet. Among them, fine grain technology and diffusion technology are currently recognized as the most effective two methods. The fine grain technology is to reduce grain size, form single-domain grains as much as possible, reduce the number of magnetic domains in the single magnet grain, reduce the defects in the grains and achieve the purpose of improving the coercivity of the magnet. However, the coercivity improving effect obtained by the fine grain technology is limited, the inevitable oxidation activity of the magnet is improved with the reduction of the grain size, and difficult magnetization caused by the reduction of the grain size occurs, so that the more rigorous requirements on the precision and the reliability of the conventional equipment tool are provided, and the industrial mass production is of high difficulty. The diffusion technology is to accurately put heavy rare earth elements such as Dy and/or Tb in the magnet, so that the heavy rare earth elements diffuse from the surface of the magnet into the magnet and are enriched at a grain boundary, and the coercivity of the magnet is improved.

The grain boundary diffusion technology can adopt a small amount of heavy rare earth, so that the coercivity is greatly improved without a significant decrease in remanence, and the grain boundary diffusion technology is therefore widely accepted and applied in the industry. The grain boundary diffusion technology is re-innovative development of the classic diffusion theory in the neodymium-iron-boron industry, and the main principle of the grain boundary diffusion technology is that heavy rare earth elements such as Dy and/or Tb diffuse from the surface of a magnet to the center of the magnet along a grain boundary phase under a high temperature condition, the heavy rare earth elements are enriched on the grain boundary phase and replace Nd at the outer edge layer of main phase grains, a shell-shaped structure enriched with Dy or Tb is formed at the outer edge of the main phase grains, and the anisotropy field at the outer edge of the grains is improved, so that the effect of greatly improving the coercivity is achieved. The grain boundary diffusion technology has a diffusion driving force of the concentration difference of Dy and/or Tb, so that the concentration difference of Dy and/or Tb is formed from the surface of the magnet to the inside of the magnet after the grain boundary diffusion technology is applied in the magnet, and further, Hcj (coercivity) of the magnet is in a gradient distribution from the surface of the magnet to the inside of the magnet.

The magnetic steel embedded and assembled in the high-speed operating motor, such as the magnetic steel for an automobile driving motor or the magnetic steel for an air conditioner compressor motor, is not wholly and uniformly thermally demagnetized due to the temperature rise of the whole motor in the actual application process, and thermal demagnetization often occurs at corner positions, especially 4 edges in contact with a motor silicon steel sheet; whereas other regions of the magnet are less susceptible to demagnetization. The grain boundary diffusion technology has been widely accepted and applied in embedded assembly motors operating at high speed due to its unique Hcj distribution.

According to the reference Anisotropic diffusion mechanism in grain boundary diffusion processed Nd—Fe—B sintered magnet, diffusion treatment for the neodymium-iron-boron magnet has different diffusion effects in different directions, wherein the diffusion effect is optimal along the magnetizing direction, and the diffusion material can diffuse deeper into the magnet; and the diffusion depth of the diffusion material is limited in the non-magnetizing direction, and the diffusion material is mainly concentrated in the surface layer of the magnet. Correspondingly, it is determined that when the diffusion material diffuses in magnetizing direction, the Hcj of the magnet is greatly increased, and the Br reduction of the magnet is slightly larger; when the diffusion is in a non-magnetizing direction, most of the diffusion materials are concentrated in the surface layer of the magnet, so that the internal structure of the magnet is not uniform, the squareness is poor, and the demagnetization resistance of the magnet is further influenced.

Generally, most enterprises or scholars in the industry research diffusion in the magnetizing direction, or the diffusion is performed on six surfaces of a magnet, so that the best diffusion effect is obtained by ensuring the diffusion in at least the magnetizing direction, and the great improvement of Hcj is achieved.

Patent Reference CN101939804A describes that by coating four surfaces of a magnet parallel to the magnetizing direction, the magnet can obtain a high coercivity, and this coating is particularly suitable for a permanent magnet rotating motor because the magnet is not easily demagnetized even at a high temperature when the edge of the magnet is coated. The patent effectively combines the actual operating state of the motor with the special rule of the diffusion magnet, and effectively maintains the magnetic flux of the magnet on the basis of ensuring the demagnetization resistance of the magnet. However, the problem that the internal structure of the magnet is not uniform and the squareness is poor is not solved when the diffusion material is coated on four surfaces of the magnet parallel to the magnetizing direction, and the improvement of the demagnetization resistance of the magnet is limited. When soaking method is adopted to coat four surfaces parallel to the magnetizing direction, two opposite surfaces perpendicular to the magnetizing direction need to be isolated, and the diffusion material cannot be uniformly distributed on the surface of the magnet due to the action of gravity; while when magnetron sputtering is adopted to coat the four surfaces, the diffusion material can be completely adhered to the four surfaces only by multiple treatments, so that the production efficiency is low, and the mass production cost is high.

SUMMARY

In order to solve the technical problems and the difficulty of practical large-scale production above, the present disclosure provides a neodymium-iron-boron magnet, a manufacture method therefor and an use thereof.

Specifically, the present disclosure provides a neodymium-iron-boron magnet represented by a chemical formula R1-R2-Fe-M-B and having a composite structure of a high-coercivity region and a high-remanence region;

wherein, R1 is a rare earth element comprising at least Nd, R2 is a heavy rare earth element comprising at least Dy and/or Tb, and M is a transition metal element comprising at least Co.

Preferably, R2 in the neodymium-iron-boron magnet has a content of ≤1.0 wt %, such as ≤0.8 wt %, preferably ≤0.5 wt %.

According to an embodiment of the present disclosure, the neodymium-iron-boron magnet has a high-coercivity region with a high R2 content and a high-remanence region with a low R2 content.

For example, the distribution of the high-coercivity region and the high-remanence region is substantially as shown in FIG. 1.

According to an embodiment of the present disclosure, the concentration difference Δ1 of R2 between a surface layer of the high-remanence region and a position at about 1 mm inside the magnet is less than or equal to 0.1%.

According to an embodiment of the present disclosure, the concentration difference Δ2 of R2 between a surface layer of the high-coercivity region and a position at about 1 mm inside the neodymium-iron-boron magnet is greater than or equal to 0.15%;

According to an embodiment of the present disclosure, Δ2/Δ1≥1.5, preferably Δ2/Δ1≥2, and for example, Δ2/Δ1 is selected from 5.5, 6.33, and 7.4.

According to an embodiment of the present disclosure, the high-coercivity region has a width of 1 to 5 mm, preferably 1.5 to 4 mm, and the central region has a high-remanence region, so that reduction of magnetic flux of the magnet can be effectively avoided. The high-coercivity region herein is defined as a region extending from a surface layer of the magnet to a certain position inside of the magnet, where the concentration difference of R2, comparing to surface layer of the magnet, is 1%, and the width of the high-coercivity region is defined as the distance between the surface layer and the position inside of the magnet mentioned above.

According to an embodiment of the present disclosure, the neodymium-iron-boron magnet has a structure substantially as shown in FIG. 1.

According to an embodiment of the present disclosure, R1 may further comprise at least one selected from lanthanum (La), cerium (Ce), praseodymium (Pr), promethium (Pm), samarium (Sm), europium (Eu) and scandium (Sc) in addition to Nd.

According to an embodiment of the present disclosure, R1 in the neodymium-iron-boron magnet has a content of 28 to 32 wt %, such as 29 to 31 wt %, and for example, 28 wt %, 29 wt %, 30 wt %, 31 wt %, or 32 wt %.

According to an embodiment of the present disclosure, R2 may further comprise at least one selected from gadolinium (Gd), holmium (Ho), erbium (Er), thulium (Tm), ytterbium (Yb), lutetium (Lu) and yttrium (Y) in addition to Dy and/or Tb.

According to an embodiment of the present disclosure, M may further comprise at least one selected from Cu, Ga, Zr, Ti, Al, Mn, Zn, W and the like in addition to Co; for example, M is selected from at least one selected from Co, Al, Cu and Ga.

According to an embodiment of the present disclosure, the Co in the neodymium-iron-boron magnet has a content of 1 to 3 wt %, such as 1.5 to 2.5 wt %, and for example, 1 wt %, 1.5 wt %, 2 wt %, 2.5 wt % or 3 wt %.

According to an embodiment of the present disclosure, based on the neodymium-iron-boron magnet, the remaining transition metal elements other than Co in M have a content of ≤2 wt %, such as ≤1.5 wt % or further ≤1 wt %, and for example, 0.1 wt %, 0.15 wt %, 0.2 wt %, 0.3 wt %, 0.35 wt %, 0.4 wt %, 0.5 wt %, 0.6 wt %, 0.7 wt %, 0.8 wt %, 0.9 wt % or 1.0 wt %.

According to an embodiment of the present disclosure, B in the neodymium-iron-boron magnet has a content of 0.5 to 1.3 wt %, such as 0.8 to 1.05 wt % and for example, 0.8 wt %, 0.9 wt %, 0.98 wt %, 1.0 wt % or 1.05 wt %.

According to an embodiment of the present disclosure, the neodymium-iron-boron magnet may further contain an inevitable impurity, such as at least one selected from C, N and the like.

According to an embodiment of the present disclosure, the neodymium-iron-boron magnet has excellent demagnetization resistance. For example, at the working temperature of the magnetic steel, the neodymium-iron-boron magnet has a squareness of ≥0.9. The demagnetization resistance of the magnet mainly depends on the demagnetization resistance of the magnet itself and the working load point of the motor. The squareness of the magnet at the working temperature determines the matching relation between the demagnetization resistance of the magnet itself and the working load point of the motor, and the higher the squareness is, the higher the demagnetization resistance of the magnet itself is, and the smaller the influence of the working load point of the motor is.

The present disclosure further provides a preparing method for the neodymium-iron-boron magnet described above, which comprises the following steps:

manufacturing or preparing a base magnet with an R1-Fe-M-B-based structure, forming films on two opposite surfaces of the base magnet respectively with the heavy rare earth element R2 at least comprising Dy and/or Tb, and then performing diffusion treatment, wherein R2 diffuses from the surface of the magnet to the inside along a grain boundary of the base magnet and then is enriched at the grain boundary, so as to obtain the neodymium-iron-boron magnet;

wherein, R1, R2, M and the B, as well as contents thereof, are defined as above respectively.

According to an embodiment of the present disclosure, the base magnet can be prepared by a method known in the art, for example, by smelting, pulverizing, pressing, heat treatment, etc.

For example, raw material powders are prepared according to the content of each element as described above, and the raw material powders are melted into molten steel by heating (for example, at 1400 to 1520° C.), and the molten steels gradually form alloy flakes after cooling by quenching, nucleation and crystallization.

For example, the pulverizing is carried out by means of jet milling to obtain jet-milled powders having an average particle size of 1 to 5 μm, preferably 2 to 4 μm.

For example, a lubricant known in the art is added to the jet-milled powders before pressing, and the powders are pressed and shaped under the action of an external magnetic field after sufficient mixing.

For example, the heat treatment has a temperature of 1050 to 1100° C. and for example, 1070° C. or 1075° C.; the heat treatment has an incubation time of 200 to 400 min and for example, 270 min or 300 min.

According to an embodiment of the present disclosure, the base magnet is a regular hexahedron.

According to an embodiment of the present disclosure, said two opposite surfaces are two opposite surfaces that are neither perpendicular to the magnetic direction of the base magnet, nor perpendicular to the pressing direction (i.e., the magnetizing direction) in which the base magnet is formed. The two opposite surfaces are specifically as shown in FIG. 2. R2 is formed to the films on the two opposite surfaces, which can more effectively improve the effective utilization rate of the diffused heavy rare earth elements, avoid the waste of the heavy rare earth elements and furthest avoid the influence of remanence reduction of the magnet.

According to an embodiment of the present disclosure, R2 may be formed to the films on the surfaces of the base magnet by a method known in the art, including but not limited to vacuum evaporation, magnetron sputtering, coating and the like. For example, equal amounts of R2 are vacuum-evaporated, magnetron-sputtered or coated on two opposite surfaces of the base magnet. For example, in each surface, the amount of R2 is ≤0.5 wt %, such as 0.4 wt % or 0.2 wt %.

According to an embodiment of the present disclosure, the diffusion treatment is performed under a vacuum degree of <$10^2$ Pa.

According to an embodiment of the present disclosure, the diffusion treatment can be accomplished by performing by a first heating, a first incubation, quenching cooling, and then a second heating and a second incubation successively. For example, by the first heating, the temperature is heated to 850 to 950° C., such as 880 to 930° C., and for example, 900° C. For example, a duration for the first incubation is 500 to 700 min, such as 550 to 650 min, and for example, 600 min. For example, by the quenching cooling, the temperature is decreased to 15 to 40° C., such as 20 to 35° C., and for example, 25° C. (room temperature). For example, a rate for the quenching cooling is 5 to 30° C./min, such as 10 to 20° C./min, and for example, 5° C./min, 10° C./min, 15° C./min, 20° C./min, 25° C./min, 30° C./min. For example, by the second heating, the temperature is heated to 500 to 600° C., such as 520 to 580° C., and for example, 550° C. For example, a duration for the second incubation is 200 to 300 min, such as 220 to 270 min, and for example, 240 min.

The present disclosure further provides a neodymium-iron-boron magnet prepared by the method described above.

The present disclosure further provides use of the neodymium-iron-boron magnet in an embedded motor.

The present disclosure further provides a magnetic steel comprising the neodymium-iron-boron magnet.

The present disclosure further provides an embedded motor comprising the neodymium-iron-boron magnet and/or the magnetic steel described above. Preferably, the neodymium-iron-boron magnet and/or the magnetic steel are assembled in the motor in an embedded mode.

Advantageous Effects

The neodymium-iron-boron magnet of the present disclosure can greatly improve resistance to high-temperature demagnetization and inhibit reduction of magnetic flux of a magnet by adopting a small amount of Dy/Tb. The magnet can be useful in an embedded high-speed motor. The preparing method for the magnet can further greatly improve the material utilization and the production efficiency, and is feasible for a large-scale production.

The inventors found that where the diffusion direction of the heavy rare earth element is parallel to the C-axis of the magnet, the diffusion depth of the heavy rare earth element in a direction parallel to the magnetizing direction of the magnet is the largest, and the diffusion effect is optimal, the heavy rare earth element can diffuse into the inside of the magnet from the surface of the magnet to the central region of the magnet, thus forming a gradient distribution of coercivity. However, in the magnet applied to the embedded motor, the region where demagnetization easily occurs is only one layer on the outermost surface, and demagnetization hardly occurs inside, as shown in FIG. 3. That is to say, heavy rare earth elements diffused into the inside of the magnet are wasted, and inevitably diffuse into main phase grains in the diffusion process, so that the remanence of the magnet is reduced, and the output power of the motor is influenced.

The inventors further found that when the film formation and diffusion of heavy rare earth are performed on the surface perpendicular to the pressing direction of the magnet, the diffusion depth is smaller and the increase of the coercivity is lower compared with the diffusion in the magnetizing direction, and the squareness range at the working temperature of the magnet is less than 0.9, which greatly influences the demagnetization resistance of the magnet during the operation of the motor. When the film forming and diffusion of the heavy rare earth are performed on two opposite surfaces of the magnet which are not perpendicular to the pressing direction of the magnet and are not perpendicular to the magnetizing direction, although the diffusion depth of the heavy rare earth elements is also smaller, the coercivity increase of the magnet is between the diffusion of the magnet in the pressing direction and the diffusion of the magnet in the magnetizing direction, and the squareness at the working temperature is greater than or equal to 0.9.

When the flakes are cooled and crystallized in the smelting process, main phase grains grow from the contact surface to the free surface in a direction perpendicular to the C-axis, which means that the C-axis of the main phase is perpendicular to the two adjacent grain boundary phases on the cross-section of the flakes. When being subjected to HD crushing, the flakes are broken from the grain boundary, that is, a front end and a rear end of the main phase grain surface pointed by the C-axis are both accompanied by partial grain boundary phases. After being pulverized into fine powder by jet mill, the main phase grains are deflected under the action of a magnetic field when pressed during magnetization. Then, when the main phase grains are pressed, there is no grain boundary phase or a very thin grain boundary phase between the grains perpendicular to the pressing direction, and the grain boundary phase between the grains parallel to the pressing direction is relatively thick. In the solid-liquid sintering stage, the thicker grain boundary phase can be fused into a liquid phase, which acts as a flux to promote the growth of main phase grains; or forms a grain boundary phase by filling between the two adjacent main phase grains by capillary tension principle; or forms a larger triangular grain boundary phase or a thicker binary grain boundary phase, in which impurity compounds such as rare earth oxide are easily formed due to the active property of the RE element. Therefore, the uniformity of the grain boundary phase in the direction parallel to the pressing direction is poor, the impurities are more, and the displacement diffusion reaction is not easy to occur, which may cause slight increase in coercivity and low squareness of the magnet when the diffusion is along the pressing direction. In the direction perpendicular to the pressing direction, due to no grain boundary phase or relatively thin grain boundary phase, the grain boundary phase is repaired by liquefying and filling the grain boundary phase parallel to the pressing direction during sintering, a continuous, uniform and thin grain boundary phase is formed, the displacement diffusion reaction is easy to occur, but the diffusion depth and the effect are slightly inferior to those of the orientation diffusion when the formed grain boundary phase is perpendicular to the C-axis of the magnet. Therefore, when the diffusion is perpendicular to the pressing direction and the diffusion direction, the diffusion depth and the diffusion effect are highly overlapped with the actual demagnetization-susceptible region of the magnet when the motor operates, the high-efficiency application of the heavy rare earth is achieved, the squareness can be greater than or equal to 0.9, and the demagnetization resistance of the magnet is ensured.

Because the film formation of the heavy rare earth is not performed on the surface of the magnet perpendicular to the magnetizing direction, the content of the heavy rare earth is lower in most regions of the surface perpendicular to the magnetizing direction, the reduction of the remanence is significantly inhibited, and the magnetic flux of the magnet is effectively ensured to be maintained. Compared with the patent reference CN101939804A in which film formation and diffusion are performed on four surfaces of the magnet block except for the surface perpendicular to the magnetizing direction of the magnet, the present disclosure provides that film forming and diffusion are performed on only two opposite surfaces of the magnet, which not only simplifies production process, reduces the amount of used heavy rare earth and greatly improves the feasibility of industrial production, but also is suitable for the application field of embedded high-speed motors. When the embedded high-speed motor operates at a working temperature and at a high speed, the demagnetization-susceptible region is the edge position where the magnet is contacted with the motor silicon steel sheet assembly, and when the edge has high coercivity, the high-temperature thermal demagnetization of the magnetic steel can be effectively resisted. A range of surface layer region of demagnetization of the magnetic steel in the embedded motor is smaller; the high-coercivity region obtained by the diffusion of the magnetic steel corresponds to the demagnetization-susceptible region of the magnet (as shown in FIG. 3). The embedded assembly mode shown in FIG. 3 can effectively improve the demagnetization resistance of the magnet and significantly inhibit reduction of magnetic flux of the magnet.

DETAILED DESCRIPTION

Figure 1:
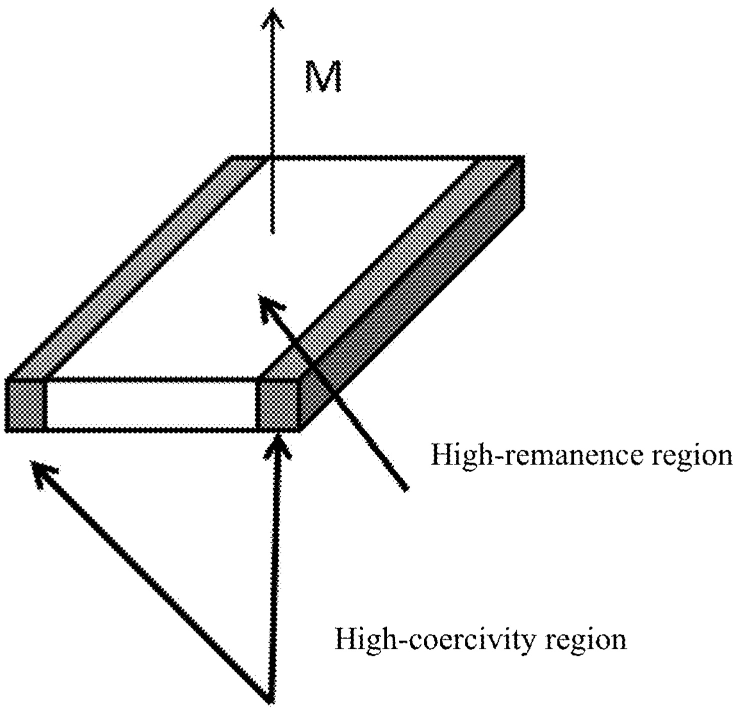
FIG. 1 is a schematic diagram of a high-remanence region and a high-coercivity region of the neodymium-iron-boron magnet according to the present disclosure.
Figure 2:
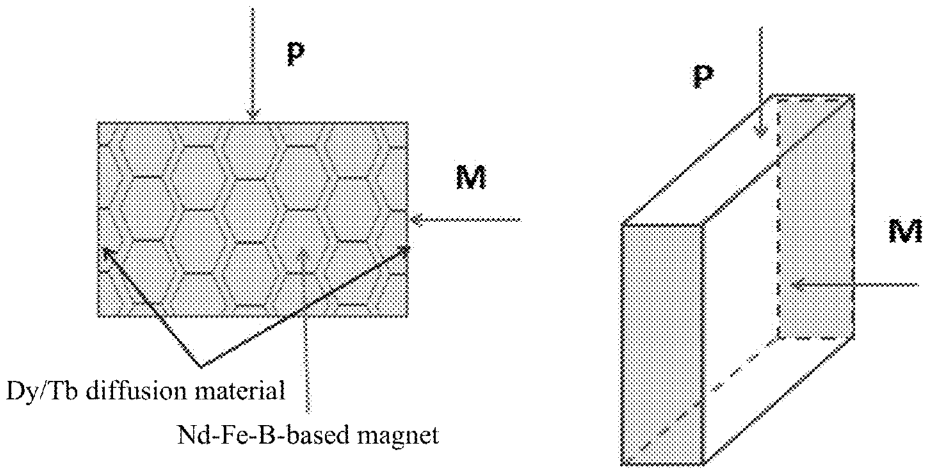
FIG. 2 is a schematic diagram of a diffusion surface of the neodymium-iron-boron magnet according to the present disclosure.
Figure 3:
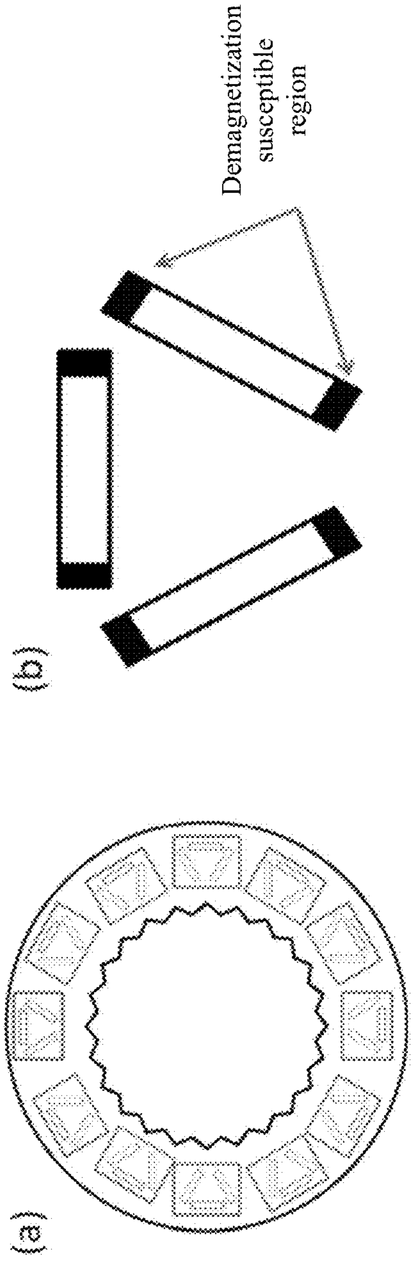
FIG. 3 is a schematic structural diagram of the embedded motor (a) and the magnetic steel (b).

The technical scheme of the present disclosure will be further illustrated in detail with reference to the following specific examples. It should be understood that the following examples are merely exemplary illustration and explanation of the present disclosure, and should not be construed as limiting the protection scope of the present disclosure. All techniques implemented based on the content of the present disclosure described above are encompassed within the protection scope of the present disclosure.

Unless otherwise stated, the starting materials and reagents used in the following examples are all commercially available products or can be prepared by known methods.

The method for measuring concentration difference of heavy rare earth elements in the examples comprises the following steps:

the high-remanence region: from the surface layer of the center position of the surface of the magnet perpendicular to the magnetizing direction to the inside of the magnet, small test pieces with a size of 1×1×1 mm were processed respectively, soaked in an acid until completely dissolved, and then measuring the content of R2 and the content difference Δ1 of R2 by a spectrum method;

the high-coercivity region: defining one side of the high-coercivity region far away from the high-remanence region as a surface layer, from the surface layer to the inside of the magnet, small test pieces with a size of 1×1×1 mm were processed respectively, soaked in an acid until completely dissolved, and then measuring the content of R2 and the content difference Δ2 of R2 by a spectrum method.

The squareness referred herein is measured by a magnetometer with the final magnet as a sample standard size. The gradient distribution of coercivity referred herein is measured by processing a test piece with a size of 1×1×1 mm on a magnet and using a strong pulse PFM06 device.

Example 1

A R1-Fe-M-B-based magnet was prepared in this example. The raw material alloy was prepared according to the following composition proportions: R1 is Nd with a content of 30.5 wt %; Co has a content of 1.5 wt %; M is Al, Cu and Ga with contents of 0.1 wt %, 0.1 wt % and 0.15 wt %, respectively; B has a content of 0.95 wt %, the balance is Fe and inevitable impurities, such as C, N, etc. The specific preparing process of the neodymium-iron-boron-based magnet comprises:

a) smelting: putting the above prepared raw materials into a crucible by adopting a vacuum induction smelting furnace, heating to 1480° C., melting the raw materials into molten steel, pouring the molten steel fully dissolved onto a quenching roller, quenching-cooling, nucleating and crystallizing on the roller surface, and gradually growing to form alloy flakes;

b) pulverizing: performing HD crushing and then jet milling on the obtained alloy flakes to obtain jet-milled powders having an average particle size with SMD of 3.0 μm;

c) pressing: adding 0.3 wt % of a lubricant into the jet-milled powders, mixing for 120 min by using a mixer, pouring the mixture into a film cavity of a press, and pressing and forming under the action of an external magnetic field of 2.5 T;

d) sintering: putting the pressed compact body into a sintering furnace, incubating at 1075° C. for 300 min, and then quenching-cooling the compact body to room temperature at a cooling speed of 20° C./min to manufacture the sintered neodymium-iron-boron-based magnet.

The base magnet was processed into a small piece with a size of 10-10-10 mm, and Dy metal sputtering coating on the surface of the base magnet according to Table 1 was performed by adopting a magnetron sputtering method.

TABLE 1

Different coating positions of metal Dy on the surface of a magnet

| Test No. | Application position of metal Dy |
|---|---|
| 1 | None |
| 2 | two opposite surfaces perpendicular to the orientation direction, each surface being sputtered with 0.4 wt % of Dy based on the weight of the magnet |
| 3 | two opposite surfaces perpendicular to the pressing direction, each surface being sputtered with 0.4 wt % of Dy based on the the weight of the magnet |
| 4 | two opposite surfaces which are neither perpendicular to the orientation direction, nor perpendicular to the pressing direction, each surface being sputtered with 0.4 wt % of Dy based on the weight of the magnet |

Then the magnets treated according to Table 1 were put into a diffusion furnace for diffusion treatment, wherein the furnace had a vacuum degree of <$10^{-2}$ Pa, then the magnets in the furnace were heated to 900° C., incubated for 600 min, quenching-cooled at a speed of 15° C./min to room temperature, and then further heated to 550° C. and incubated for 240 min to obtain the finished magnets. The magnetic properties and the compositions of the finished magnets were measured, and the results are shown in Table 2.

TABLE 2

Summary of properties and compositions of finished magnets

| Test | Concentration difference of heavy rare earth (%) | | | High-coercivity region Width | Coercivity | | Magnetic moment (mWb · |
|---|---|---|---|---|---|---|---|
| No. | Δ1 | Δ2 | Δ2/Δ1 | (mm) | (kA/m) | Hk/Hcj | cm) |
| 1 | — | — | — | 0 | 1055 | 0.98 | 0.1406 |
| 2 | — | — | — | — | 1513 | 0.97 | 0.1392 |
| 3 | 0.05 | 0.37 | 7.4 | 1.2 | 1346 | 0.85 | 0.1402 |
| 4 | 0.04 | 0.22 | 5.5 | 2.4 | 1476 | 0.93 | 0.1398 |

Figure 4:
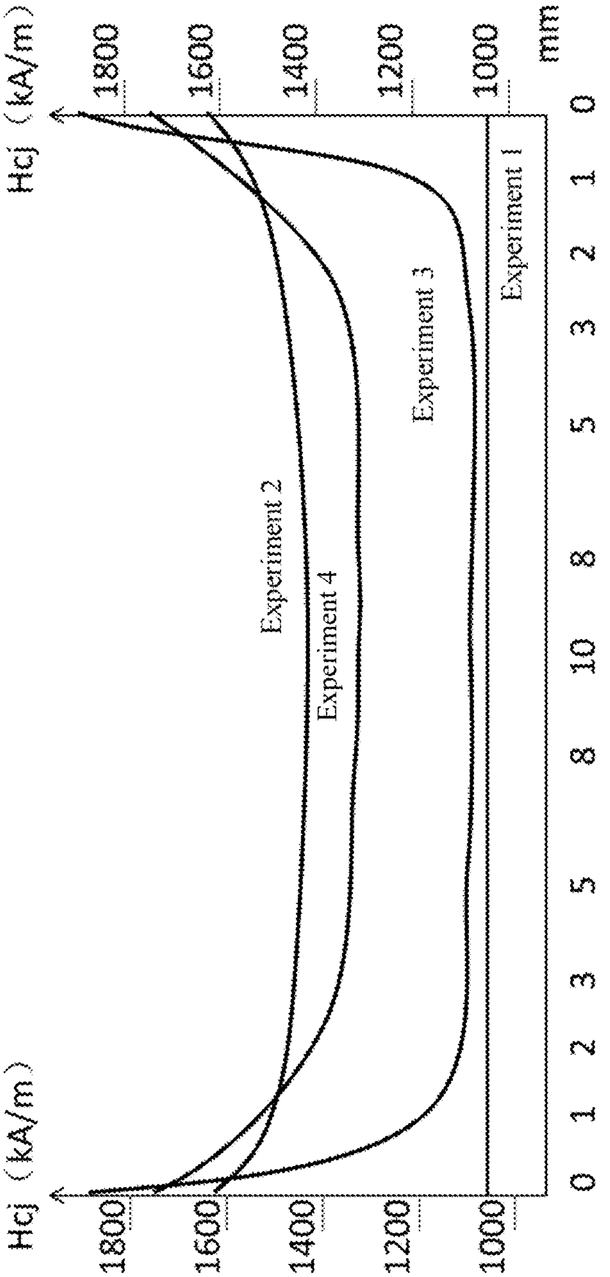
FIG. 4 is a relationship diagram of coercivity and diffusion depth.

The coercivity, squareness and magnetic moment in the above tests 1, 2, 3 and 4 were comprehensively compared. Among them, test 4 had the highest comprehensive performance, the width of the high-coercivity region is 2.4 mm, and thus the demagnetization-susceptible region when the motor runs at a high speed can be covered. Further, the test piece was processed in the diffusion direction, and the relationship between the coercivity and the diffusion depth was measured, as shown in FIG. 4. It can be seen that, in test 2 in which the diffusion is along the magnetizing direction, the average value of coercivity was highest and the fluctuation change was smallest along the diffusion depth; in test 3 in which the diffusion is along the pressing direction, the coercivity formed a sharp peak value on the diffusion surface and occurred a sharp decline when the diffusion entered a position at 1 mm inside the magnet, and the coercivity at the center position was almost equivalent to that of the magnet without diffusion treatment; in test 4, the coercivity of the magnet was reduced in gradient at a position of 0-3 mm on the surface layer of the magnet, the coercivity of the outermost layer was diffused due to the magnetizing direction of test 2, namely the demagnetization resistance of the outermost layer was superior to that of test 2, and gradually became gentle at a position of more than 3 mm on the surface layer, the coercivity was about 250 kA/m higher than that of the magnet without diffusion treatment, and the demagnetization resistance of the magnet was also improved to a certain extent.

Example 2

A R1-Fe-M-B-based magnet prepared in this example. The raw material alloy was prepared according to the following composition proportions: R1 is Nd with a content of 31 wt %; Dy has a content of 0.5 wt % and Co has a content of 2.0 wt %; M is Al, Cu and Ga with contents of 0.15 wt %, 0.15 wt % and 0.1 wt %, respectively; B has a content of 0.98 wt %, the balance is Fe and inevitable impurities, such as C, N, etc. The specific preparing process of the neodymium-iron-boron-based magnet are as follows:

a) smelting: putting the above prepared raw materials into a crucible by adopting a vacuum induction smelting furnace, heating to 1460° C., melting the raw materials into molten steel, pouring the molten steel fully dissolved onto a quenching roller, quenching-cooling, nucleating and crystallizing on the roller surface, and gradually growing to form alloy flakes;

b) pulverizing: performing HD crushing and then jet milling on the obtained alloy flakes to obtain jet-milled powders having an average particle size with SMD of 2.8 μm;

c) pressing: adding 0.2 wt % of a lubricant into the jet-milled powders, mixing for 180 min by using a mixer, pouring the mixture into a film cavity of a press, and pressing and forming under the action of an external magnetic field of 2.5 T;

d) sintering: putting the pressed compact body into a sintering furnace, incubating at 1070° C. for 270 min, and then quenching-cooling the compact body to room temperature at a cooling speed of 10° C./min to manufacture the sintered neodymium-iron-boron-based magnet.

The base magnet was processed into 40-8-20 and 40-8-2.5 square pieces (20 and 2.5 were the thickness in the magnetizing direction respectively), and metal Tb was coated on the surface of the base magnet according to the coating method as shown in Table 3.

TABLE 3

Different position treatment of metal Tb on the surface of a magnet

| Test No. | Magnet size | Application position of metal Tb |
|---|---|---|
| 5 | 40-8-2.5 | None |
| 6 | 40-8-20 | two opposite surfaces with a size of 40 × 20, each surface being coated uniformly with 0.2 wt % of Tb based on the weight of the magnet |
| 7 | 40-8-2.5 | two opposite surfaces with a size of 40 × 8, each surface being coated uniformly with 0.2 wt % of Tb based on the weight of the magnet |

Then the magnets treated according to Table 3 were put into a diffusion furnace for diffusion treatment, wherein the furnace had a vacuum degree of $<10^{-2}$ Pa, then the magnets in the furnace were heated to 900° C., incubated for 600 min, quenching-cooled at a speed of 15° C./min to room temperature, and then heated to 550° C. and incubated for 240 min to obtain the finished magnets. The square piece of 40-8-20 after the diffusion treatment in test 6 was processed into a test piece of 40-8-2.5, and the magnetic properties and compositions were measured together with the test pieces in test 5 and test 7. The test results are shown in Table 4.

TABLE 4

Summary of properties and compositions of finished magnets

| Test No. | Tb content (%) Δ1 | Δ2 | Δ2/Δ1 | High-coercivity region Width (mm) | Hcj (kA/m) Surface layer | 3-mm position | Hk/Hcj | Magnetic moment (mWb · cm) |
|---|---|---|---|---|---|---|---|---|
| 5 | — | — | — | 0 | 1256 | 1248 | 0.99 | 0.1071 |
| 6 | 0.03 | 0.19 | 6.33 | 2.0 | 2224 | 1984 | 0.95 | 0.1056 |
| 7 | — | — | | — | 2068 | 2013 | 0.97 | 0.1049 |

Compared with test 7, magnet in test 6 had lower coercivity at the position of 3 mm, but the coercivity of the outermost layer was 156 kA/m higher than that of test 7, so that the demagnetization of an external magnetic field on the magnet can be effectively resisted; meanwhile, the magnetic moment was higher by about 0.6%, the reduction of the magnetic moment was effectively avoided, and the high-efficiency output of the magnetic field of the magnet was ensured.

The above examples according to the present disclosure have been described above. However, the present disclosure is not limited thereto. Any modification, equivalent, improvement and the like made without departing from the spirit and principle of the present disclosure shall fall within the protection scope of the present disclosure.

The invention claimed is:

1. A neodymium-iron-boron magnet represented by formula R1-R2-Fe-M-B, comprising a base magnet comprising R1, Fe, M, and B, and a first and a second films comprising R2 disposed on the base magnet, wherein, R1 is a rare earth component comprising at least Nd, R2 is a heavy rare earth component comprising at least one selected from Dy and Tb, and M is a transition metal component comprising at least Co;

wherein the neodymium-iron-boron magnet has a shape of a cuboid having a first pair of opposite surfaces perpendicular to a magnetizing direction of the neodymium-iron-boron magnet, a second pair of opposite surface perpendicular to a direction of pressing that forms the neodymium-iron-boron magnet into the cuboid, and a third pair of opposite surfaces that are not perpendicular to the magnetizing direction and are not perpendicular to the direction of pressing;

wherein the first and the second films are disposed on each of the third pair of opposite surfaces, respectively, and none of the first and the second pairs of opposite surfaces has a film comprising R2 disposed thereon;

wherein the neodymium-iron-boron magnet comprises a first region extending from the third pair of opposite surfaces into a body of the neodymium-iron-boron magnet, and the first region has a first R2 content, and a second region having a second R2 content that is lower than that of the first R2 content;

wherein the first concentration difference Δ1 in R2 between the second region and a position at 1 mm inside the neodymium-iron-boron magnet from the surface is less than or equal to 0.1 wt %; and the second concentration difference Δ2 in R2 between the first region and a position at 1 mm inside the neodymium-iron-boron magnet from the surface is greater than or equal to 0.15 wt %.

2. The neodymium-iron-boron magnet according to claim 1, wherein a content of R2 in the neodymium-iron-boron magnet is ≤1.0 wt %.

3. The neodymium-iron-boron magnet according to claim 1, wherein R1 further comprises at least one selected from lanthanum (La), cerium (Ce), praseodymium (Pr), promethium (Pm), samarium (Sm), europium (Eu), and scandium (Sc).

4. The neodymium-iron-boron magnet according to claim 1, wherein R2 further comprises at least one selected from gadolinium (Gd), holmium (Ho), erbium (Er), thulium (Tm), ytterbium (Yb), lutetium (Lu), and yttrium (Y).

5. The neodymium-iron-boron magnet according to claim 1, wherein the content of R2 in the neodymium-iron-boron magnet is ≤0.8 wt %.

6. The neodymium-iron-boron magnet according to claim 1, wherein the content of R2 in the neodymium-iron-boron magnet is ≤0.5 wt %.

7. The neodymium-iron-boron magnet according to claim 1, wherein Δ2/Δ1≥1.5.

8. The neodymium-iron-boron magnet according to claim 1, wherein Δ2/Δ1≥2.

9. The neodymium-iron-boron magnet according to claim 1, having a shape of a cuboid having three pairs of opposite surfaces, wherein the first region starts from the third pair of the opposite surfaces and extends into the body of the cuboid by a distance of 1-5 mm.

10. The neodymium-iron-boron magnet according to claim 1, wherein the content of R1 in the neodymium-iron-boron magnet is 28-32 wt %.

11. The neodymium-iron-boron magnet according to claim 1, wherein M further comprises at least one selected from Cu, Ga, Zr, Ti, Al, Mn, Zn, and W.

12. The neodymium-iron-boron magnet according to claim 1, wherein the content of Co in the neodymium-iron-boron magnet is 1-3 wt %.

13. The neodymium-iron-boron magnet according to claim 1, wherein based on a total weight of the neodymium-iron-boron magnet, a content of transition metal other than Co is ≤2 wt %.

14. The neodymium-iron-boron magnet according to claim 1, wherein B in the neodymium-iron-boron magnet has a content of 0.5-1.3 wt %.

15. The neodymium-iron-boron magnet according to claim 1, wherein the neodymium-iron-boron magnet further comprises an inevitable impurity of C and/or N.

16. A magnetic steel, comprising the neodymium-iron-boron magnet according to claim 1.

17. An embedded motor, comprising the neodymium-iron-boron magnet according to claim 1.

18. A preparing method for the neodymium-iron-boron magnet according to claim 1, comprising the following steps:

providing the base magnet having a shape of a cuboid, which has a first pair of opposite surfaces that are perpendicular to the magnetizing direction, a second pair of opposite surfaces that are perpendicular to the direction of pressing the mixture, and a third pair of opposite surfaces that are not perpendicular to the magnetizing direction and not perpendicular to the direction of pressing;

depositing R2 only on each of the third pair of opposite surfaces; and subjecting the product of the depositing step to a diffusion treatment to obtain the neodymium-iron-boron magnet.

19. The preparing method for the neodymium-iron-boron magnet according to claim 18, wherein R2 is deposited by vacuum evaporation, magnetron sputtering, or coating;

and/or, the diffusion treatment is performed under a vacuum of $<10^{-2}$ Pa;

and/or, the diffusion treatment comprises a first heating, a first incubation, quenching cooling, and then a second heating and a second incubation in sequence.

* * * * *